United States Patent [19]

Wiens et al.

[11] Patent Number: 4,967,296
[45] Date of Patent: Oct. 30, 1990

[54] LIGHTWEIGHT, RIGID, COMPACT CONFIGURATION FOR THE VOICE COIL, CARRIAGE AND PRINTED CIRCUIT CABLE IN A DISC DRIVE

[75] Inventors: John P. Wiens; Mark W. Pollard; John O. Weinberg, all of Santa Clara County, Calif.

[73] Assignee: Seagate Technology, Inc., Scotts Valley, Calif.

[21] Appl. No.: 325,127

[22] Filed: Mar. 14, 1989

Related U.S. Application Data

[63] Continuation of Ser. No. 112,021, Oct. 8, 1987, abandoned, which is a continuation of Ser. No. 800,059, Nov. 20, 1985, abandoned.

[51] Int. Cl.$^5$ .............................................. G11B 5/55
[52] U.S. Cl. ....................................... 360/106; 310/13
[58] Field of Search ............................... 360/104–106, 360/109, 86, 97, 98, 78; 310/12–14, 27; 318/135

[56] References Cited

U.S. PATENT DOCUMENTS

| | | | |
|---|---|---|---|
| 3,735,163 | 5/1973 | Dijkstra et al. | 310/13 |
| 3,896,319 | 7/1975 | Chari | 310/14 |
| 3,899,699 | 8/1975 | Griffing | 310/13 |
| 4,034,411 | 7/1977 | Kraemer et al. | 360/106 X |
| 4,305,105 | 12/1981 | Ho et al. | 310/12 |
| 4,331,990 | 5/1982 | Frandsen | 360/106 |
| 4,414,594 | 11/1983 | Farmer et al. | 360/106 |
| 4,462,054 | 7/1984 | Dong et al. | 360/105 X |
| 4,631,431 | 12/1986 | Viskochil | 310/13 |
| 4,730,227 | 3/1988 | Chong et al. | 360/106 |

FOREIGN PATENT DOCUMENTS

| | | |
|---|---|---|
| 0084124 | 7/1983 | European Pat. Off. |
| 3527096 | 1/1986 | Fed. Rep. of Germany |

OTHER PUBLICATIONS

IBM Technical Disclosure Bulletin, Cable Assembly For Disk Drive Head Carriage, Brende et al. vol. 26 No. 3B Aug. 1983.
IBM Technical Disclosure Bulletin, vol. 20 No. 5 Oct. 77 Voile Coil Motor, Guzman et al.

*Primary Examiner*—Robert S. Tupper
*Assistant Examiner*—Andrew L. Sniezek
*Attorney, Agent, or Firm*—Flehr, Hohbach, Test, Albritton & Herbert

[57] ABSTRACT

The carriage assembly of this invention includes an oval coil whose shape is maintained by a rectangular bobbin which is passed through the open sides of the rectangular carriage frame and fastened inside the carriage frame so that the ends of the coil protrude from the carriage frame and define symmetrical semi-cylindrical openings on either side of the carriage for cooperation with the magnetic pole pieces of the voice coil motor. The transducers are mounted to arms which fit into precision machined slots in a head mounting block mounted on the front of the rectangular carriage. The connector cable to the transducers is a printed circuit cable (PCC) that passes directly through the bottom portion of the carriage and lies flat along the path of travel of the carriage between the voice coil motor segments which define the movement of the carriage. A support bracket mounted to the rear of the path of travel of the carriage supports a portion of the PCC and causes it to loop back upon itself as the carriage moves toward the rear of the path of travel. The rear of the carriage is open, so that the upper portion of the folded PCC cable loop passes into the carriage as the carriage reaches the rear of its path of travel, minimizing the space the carriage/PCC assembly will occupy.

20 Claims, 2 Drawing Sheets

LIGHTWEIGHT, RIGID, COMPACT CONFIGURATION FOR THE VOICE COIL, CARRIAGE AND PRINTED CIRCUIT CABLE IN A DISC DRIVE

This is a continuation of application Ser. No. 112,021 filed Oct. 8, 1987, now abandoned, and is in turn a continuation application of Ser. No. 800,059 filed on Nov. 20, 1985, now abandoned.

BACKGROUND OF THE INVENTION

This invention relates generally to memory storage apparatus and more particularly to an improved disc drive memory storage apparatus having a voice coil linear actuator for reciprocatably positioning a transducer array relative to discs on which the information is recorded. More particularly, the invention is directed to an improved design for the voice coil carriage and printed circuit cable to provide a lightweight, compact and structurally rigid carriage in a disc drive.

Disc drive machines record and reproduce information stored on concentric circular tracks recorded on magnetic discs or equivalent media. The tracks are written and read by transducers which cooperate with the surface of the disc.

The need for compact, high capacity magnetic disc memory storage apparatus has resulted in considerable research into Winchester type disc drives. Due to the increased track density made possible by this research, there has been an ongoing attempt to provide an actuator capable of extremely rapid access time while maintaining the design as structurally rigid and compact. Voice control linear actuators are themselves well known in disc drive technology. Generally they include a carriage which is reciprocatably guided between a pair of carriage guide rails with the data accessing transducers, which are to cooperate with the discs, being mounted on the inner end of the carriage. The motor which drives the carriage is sometimes split into two symmetrical portions disposed on either side of the center line of the carriage to apply equal forces to the carriage generally along parallel lines to drive the carriage toward and away from the discs.

The actuator is situated adjacent the periphery of a stack of vertically spaced discs and is designed to rapidly position the transducers to access the recorded disc information. The transducers normally comprise floating read/write heads for reading and recording information on the tracks of the disc.

Through the present invention is to be described as used in a Winchester disc drive unit, it will be appreciated that the improved actuator and specifically, the improved carriage described herein may be useful in other types of electromechanical memory storage apparatus. It also has potential application to optical memory storage apparatus wherein an optical transducer or several optical transducers are incorporated in the actuator.

In the design of a high performance disc drive such as a high capacity Winchester type disc drive using a linear voice coil actuator motor, a major effort has been made to keep the carriage/coil/transducer assembly compact and lightweight. This is done to make it responsive to imposed forces from the voice coil actuator motor. However, the assembly must also be rigid, and structurally configured to maximize its dynamic response to the electronics which control the carriage position, without creating mistracking problems.

SUMMARY OF THE INVENTION

Therefore, it is an objective of this invention to provide an improved carriage configuration for a linear voice coil actuator for a disc drive. More particularly, it is an objective of the present invention to minimize the moving mass of the carriage/coil/transducer assembly of an actuator, while maximizing its structural stiffness.

Another objective of this invention is to insure to the extent possible that the propelling coil forces act symmetrically about the carriage assembly's center of gravity with the resulting forces passing through the center of gravity.

A further objective of this invention is to attempt to keep the distribution of the part's mass as close to the center of gravity as possible.

A related objective of the present invention is to make the design structurally compact to minimize the tendency of overhanging or protruding structural members to vibrate at undesirable resonant frequencies.

A further objective of this invention is to insure that the carriage assembly can be assembled in a modular fashion and is consistently reproducible in a high volume manufacturing environment.

In summary, the carriage assembly of this invention includes an oval coil whose shape is maintained by a rectangular bobbin which is passed through the open sides of the rectangular carriage frame and fastened inside the carriage frame so that the ends of the coil protrude from the carriage frame and define symmetrical semi-cylindrical openings on either side of the carriage for cooperation with the magnetic pole pieces of the voice coil motor. The transducers are mounted to arms which fit into precision machined slots in a head mounting block mounted on the front of the rectangular carriage. The connector cable to the transducers is a printed circuit cable (PCC) which passes directly through the bottom portion of the carriage and lies flat along the path of travel of the carriage between the voice coil motor segments which define the movement of the carriage. A support bracket mounted to the rear of the path of travel of the carriage supports a portion of the PCC and causes it to loop back upon itself as the carriage moves toward the rear of the path of travel. The rear of the carriage is open, so that the upper portion of the folded PCC cable loop passes into the carriage as the carriage reaches the rear of its path of travel, minimizing the space the carriage/PCC assembly will occupy. The benefits of this design are many.

Regarding the transducer arm mounting block arrangement, in the prior art two common arrangements have been: (1) transducer arms which stack on each other, and (2) transducer arms which mount into slots or openings in the carriage assembly itself.

"Stackable" arms can create a tolerancing problem if large numbers of arms are used in any given product, i.e., if the arm thicknesses deviate from the nominal dimension, these variations will build up as the arms are stacked. Another major problem with "stackable" arms is encountered during rework. If a single transducer is found to be unacceptable during assembly test, the entire assembly of arms must be taken apart to perform replacement.

Arms which mount directly into precision machined carriage openings can provide improved tolerancing. However, problems can be encountered with cleaning the assembly after the transducer leads are soldered to the printed circuit cable. The cleaning techniques are usually harmful to the carriage bearing lubricants.

In the disclosed embodiment, the transducer arms mount into precision slots in a head arm mounting block. The transducer leads are attached to the printed circuit cable which is mechanically attached to the head arm mounting block. The resulting assembly is easy to clean and test. If any transducer requires replacement the corresponding arm can be easily removed without disturbing the remainder of the arm assemblies. Upon completion of assembly and test, the "arm/PCC/mounting block" sub-assembly is attached to the carriage assembly via fasteners at the top and bottom of the mounting block.

Regarding the use of a coil which passes through the carriage, in a typical linear motor carriage coil assembly, the coil is an appendage to the carriage which mounts to the back of the carriage (producing undesirably long configurations) or mounts to the sides of the carriage (producing undesirably wide configurations). In the latter case, resonant vibration frequencies are much lower than desirable in a closed loop servo controlled system.

In the proposed embodiment, the coil passes through the center of the carriage. This results in a very short compact configuration with a minimum of side to side overhang and improves the structural integrity of the coil/carriage assembly at the same time. The dynamic coil forces acting on the assembly are very close to the assembly's center of gravity in all three axes.

In prior art examples of voice coil actuators, the PCC service loops typically reside external to the space enclosed by the voice coil motor/coil assembly. In the arrangement disclosed herein, the PCC service loop lies between the dual voice coil motor segments and the fixed end of the cable extends into the center portion of the coil/carriage assembly as the carriage is moved away from the discs. This arrangement provides an extremely compact configuration and allowed the PCC cable length to be shortened. Since this cable carries low amplitude signals, reduction of PCC length is very critical for performance improvements.

BRIEF DESCRIPTION OF DRAWINGS

The invention can be best understood by reference to the following drawing, wherein.

DETAILED DESCRIPTION OF DRAWINGS

Figure 3A:
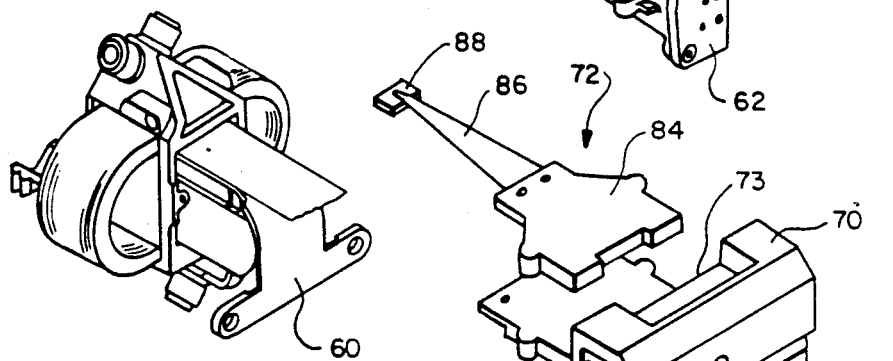
FIGS. 3A and 3B are perspective and side elevational views of the carriage assembly with the PCC service loop fully retracted, i.e., when the carriage is at its farthest from the discs.
Figures 3B, 5:
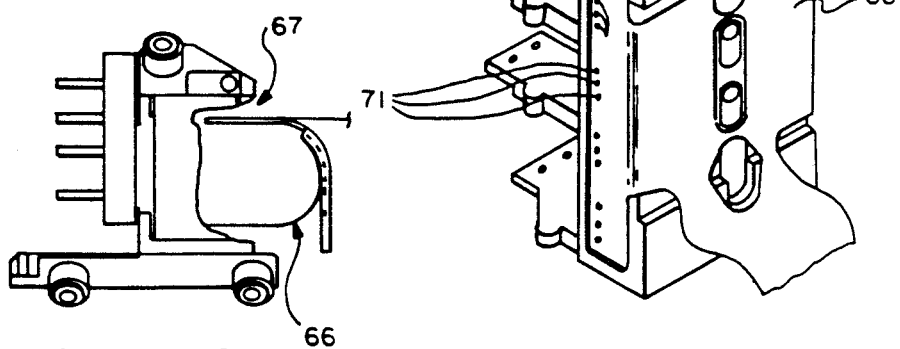
FIG. 5 is a perspective view of the transducer heads, head arms head mounting block and a portion of the PCC of this invention.

Referring now particularly to the figures, wherein like elements are identified by like reference numerals, a magnetic disc storage apparatus in accord with this invention includes a base 10. A carriage assembly generally indicated at 22 is provided for concurrently moving several accessing transducers (as shown in FIG. 5) along a linear path that extends generally radially relative to the rotating discs. In particular, the apparatus is a Winchester drive that includes fixed discs of 5¼" diameter, with an intended high track density.

The memory storage apparatus of this type is already well known in the art and includes a motor 23 for rotating the discs 25 carried on spindle 27 at high speed and associated electronic circuitry (not shown) that is operatively connected to the actuator assembly. The base 10 forms part of a closed housing that includes a filtration system adapted to keep the disc surfaces free of contaminents.

Figure 4A:
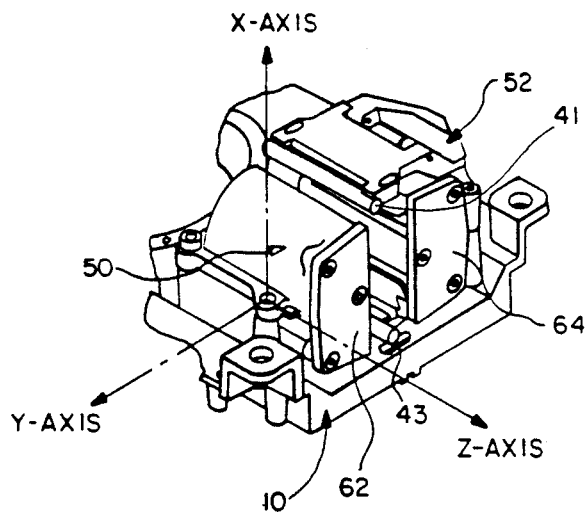
FIGS. 4A and 4B show other major elements of the actuator system including the two section voice coil motor and carriage guide rods used with the carriage of this invention.
Figure 4B:
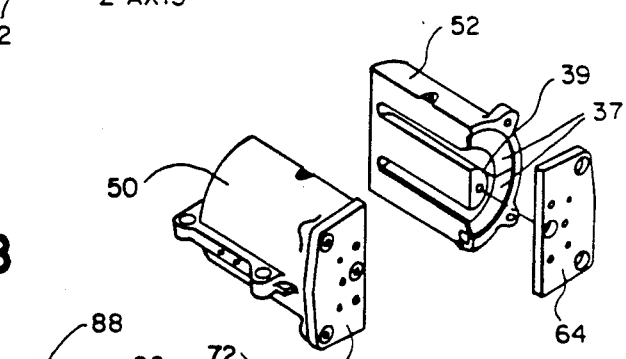

The actuator itself is disclosed in considerable detail in the application of Fasano, et al., entitled, "Thermal Isolation of the Voice Coil Motor from Base Plate and Carriage Guide Rails of a Disc Drive," U.S. Pat. application Ser. No. 06/800,058, filed Nov. 20, 1985, now U.S. Pat. No. 4,745,501, issued May 17, 1988, assigned to the assignee of the present invention, and incorporated herein by reference. The carriage itself which carries the transducers toward and away from the discs is shown in perspective and exploded views in FIGS. 1, 2 and 3. The basic framework of the carriage includes upright posts 24, 26, 28 (the fourth post not being shown) joined together by a base portion 30. The sides and rear of the carriage are purposely left open. The front of the carriage, i.e., the portion facing the discs, includes a brace mounting 32. An oval coil 34, mounted on a bobbin 36 to maintain its shape slides in through the side openings in the carriage, with the bobbin 36 being mounted to the brace mounting 32 on the front of the carriage by screws or other appropriate fasteners which are not shown. In this way, the single coil defines two symmetrical semi-cylindrical openings 38, 40 extending out on either side of the carriage to interact with the magnetic pole pieces of the voice coil motor shown in FIG. 4 and specifically the gaps included in the motor, one of which 39 is apparent in FIG. 4B. By adopting this design, a carriage of extremely light weight but high structural rigidity is achieved. The carriage rides on carriage guide rods 41,43 (FIG. 4A) described in the incorporated application, using a pair of precision ball bearings 45 on the top and two more pairs of precision ball bearings 44 on the bottom of the carriage. Its movement is controlled by energization of the coil 34 in cooperation with the magnets 37 in motor sections 50, 52 shown in FIG. 4B in a manner well known in the art.

As described before, the elements of this invention readily lend themselves to sub-assembly manufacturing procedures. As can be seen in FIG. 5, the transducers for reading and writing data on the discs are carried in head assemblies 88 mounted on flexure assemblies 86 well known in the art. These head/flexure assemblies are suitably mounted to head arms 84 which are in turn attached in precision machined slots 73 in the head arm mounting block 70, and the wire leads from the transducers (not shown) are connected to the solder pads 71 of the PCC 66. An appropriate connector (not shown) is then attached to the opposite end of the PCC 66 for interconnection to associated electronic circuitry external to the disc driver's sealed environment. This subassembly is easily tested and repaired if necessary before being integrated into the next higher level sub-assembly.

An important part of the present invention is the routing of the electrical conductors which connect the heads 88 to the previously mentioned electronics to minimize PCC length. Specifically, in this invention a support bracket 60 is attached to the mounting brackets 62, 64 at the rear end of the motor. The PCC 66 which is attached to the head arm and mounting block as shown in detail in FIG. 5, extends through the open rear of the carriage. This is shown in the side elevation of FIG. 2B and the perspective view of FIG. 2A. As is well known in the art, the amplitude of the read data signals from the transducers is very small, and must be subjected to amplification before the signals have been passed over too great a physical distance. Several manufacturers have sought to solve this design problem by including the necessary amplification electronics in the sealed head/disc assembly, usually mounting these components directly on the moving carriage assembly. This approach, however, was not chosen by the present inventors because it appears to shorten the service life of these electronic components, and additionally, necessitates violating the sealed head/disc assembly to replace these components.

Instead, the present inventors have chosen to concentrate on creating the shortest possible cable length to direct the low amplitude read data signals to amplification electronics located outside the sealed environment.

Figure 1:
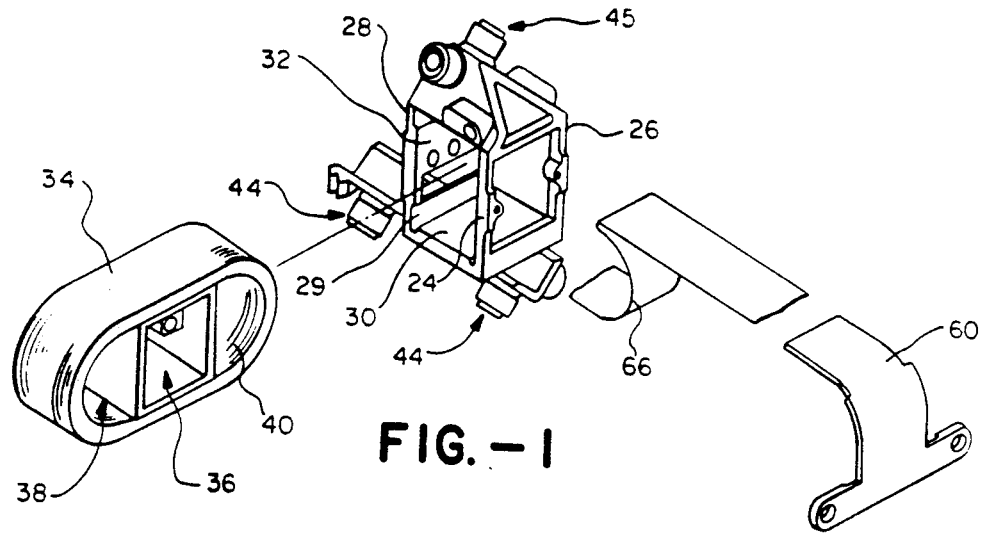
FIG. 1 is an exploded view of the carriage assembly of the present invention showing the coil, the carriage, the bobbin which supports the coil, the PCC and the support bracket for the PCC.

This is accomplished by passing the PCC connector (not shown) of the previously described head/flexure/head arm/mounting block/PCC sub-assembly shown in FIG. 5 directly through a suitably designed hole 29 in the front of the carriage 22 as seen in FIG. 1, and through a similar hole (not shown) in the bobbin 36 which supports the coil 34. The PCC 66 then passes out the rear opening 67 of the carriage 22, lying along a path parallel to the direction of forward/rearward travel of the carriage 22.

Figure 2A:
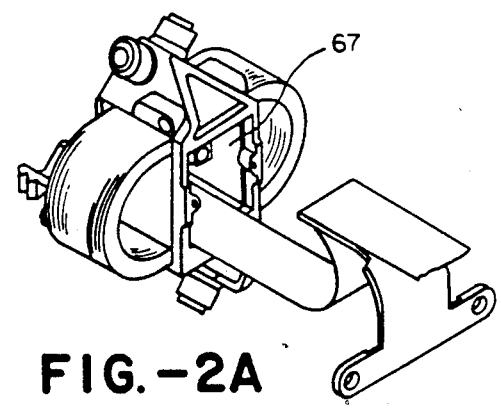
FIGS. 2A and 2B are perspective and side elevational views of the carriage assembly with the PCC service loop fully extended, i.e., when the carriage is at its closest approach to the discs.
Figure 2B:
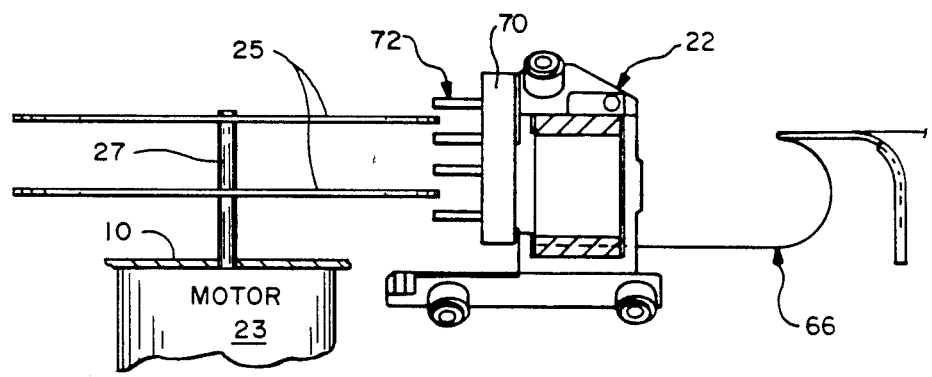

As is well known in the art, a service loop of appropriate size must be included in the length of the PCC 66 to allow for the travel range of the carriage 22. In this invention, the non-service loop length of the PCC 66 has been minimized by allowing the service loop to tuck inside the carriage 22 when the carriage 22 is in its fully retracted position. A support bracket 60 for he PCC service loop is suitably mounted to the end plates 62, 64 of the voice coil motor magnetic pole pieces 50, 52. In this way, when the carriage 22 is all the way forward as shown in FIGS. 2A and 2B, the PCC 66 is fully extended along its parallel path. As the carriage 22 moves back toward the rear of its path of travel as shown in FIGS. 3A and 3B, the PCC 66 loops back upon itself along a path parallel to the path of movement and guided by the support bracket 60. When the carriage 22 is near to its fully retracted position, the PCC service loop actually passes through the rear opening 67 into the rear of the carriage 22 as shown in FIGS. 3A and 3B. In this way, the cable is prevented from twisting or otherwise interfering with the motion of the carriage.

The head and mounting block of the present invention is shown in FIG. 5. The mounting block itself which is carried on the front of the carriage, includes printed circuit solder pads 71 which are part of the PCC 66. Precision slots 73 are machined in the front of this block, and arms 84 are inserted in each of the slots. A head suspension flexure 86 can then be mounted in accordance with standard techniques to this arm, and the transducer 88 attached to the end of this flexure. In this way, an easy, reliable and reproducible assembly is achieved.

It is desirable for the carriage to be easily inserted into or removed from the disc drive. It can be seen that by removing the end plates 62, 64 from the rear of the motor pole pieces 50, 52, such can be achieved.

The rectangular frame of the carriage 22 is fabricated from magnesium or other material having a low magnetic permeability and low mass. The shape of the carriage 22 which is shown in perspective in the figures is generally symmetrical about a vertical plane through its center line so that the center of gravity lies in such a plane. The carriage is shaped so that the center of gravity is located approximately midway between the pole pieces 50, 52 of the voice coil motor and the upper and lower carriage guide rods 41, 43 so that the forces are centralized in the carriage so that it can easily be driven back and forth in response to the actions of the motor.

The precision ball bearings which support the carriage comprise two pairs of spaced ball bearings 44 cooperating with the lower carriage rod 43 and a pair of upper ball bearings 42 cooperating with the upper carriage rod 41. The lower ball bearings 44 are at the inner and outer ends of the carriage at a substantial distance from each other, while the upper pair of ball bearings is located halfway between the lower bearings along the axis of the carriage 22 radial to the discs. The drive coil 34 is slightly offset toward the rear pair of ball bearings so that its weight is approximately balanced with the head mounting block 70, heads 88, head suspensions 86 and head arms 84 which are carried on the front of the carriage 22 to maintain the center of gravity in the center of the carriage system.

In summary, the entire carriage is designed to provide a balanced, light weight, structurally rigid carriage which may be easily assembled and maintained. The center of gravity is maintained centered in the carriage so that it may be reliably driven back and forth under the action of the motor sections 50 and 52. The single coil being passed through the center of the open rectangular frame lends structural rigidity to the frame without negatively affecting its weight. The highly efficient PCC mounting achieves a significant advantage in minimizing the length of the PCC, contributing to the compactness of the design and avoiding any possibility of the PCC interfering with the movement of the driven carriage. Other features and advantages of the present invention may become apparent to a person of skill in the art who studies the invention which is disclosed. Therefore, the scope of the present invention is to be limited only by the following claims.

What is claimed:

1. In a magnetic disc memory storage apparatus including a base, spindle means mounted to the base for rotation of a plurality of discs, a transducer array for accessing information magnetically recorded on each disc, and an actuator assembly for moving the transducer array along a straight radial path to spaced track locations on each discs, comprising a carriage, means adjacent the rotating discs for guiding the carriage for movement along a desired linear path of travel relative to the discs comprising upper and lower rails arrayed along said linear path, a pair of symmetrically disposed motor sections, one section on each side of said path, said carriage comprising a rectangular framework comprising at least four upright posts joined together by a base and a top to form said rectangular carriage framework, bearing means coupling the carriage to the guide means for travel on said linear path said bearing means comprising three pairs of bearings, two of said pairs of bearings engaging one of said rails and preceding and following said rectangular framework, and said third pair of bearings engaging the other of said rails and located adjacent the rectangular framework, and a single coil carried on said carriage in an orientation defined by said upright posts and aligned with the motor sections to drive the carriage along the path, said single coil being mounted on and supported by a rectangular bobbin located within said rectangular framework of said carriage to define semi-cylindrical open voice coils extending on either side of the carriage arranged to pass over semi-cylindrical pole piece sections of said motor as the carriage passes between the motor sections, means for mounting said transducer array comprising a head mounting block attached to the lead surface of said rectangular framework the carriage being generally symmetrical about a vertical plane through its center line, said carriage being shaped so that a center of gravity thereof is on said plane and midway between the pole pieces of said motor and midway between said rails for guiding said carriage so that forces used to linearly move said carriage are centralized in said carriage, said bobbin and said coil and said head mount block serving to maintain the shape of and provide structural rigidity to said rectangular framework and form in combination with said rectangular framework an integrated carriage assembly with maximum structural stiffness and minimal moving mass.

2. A disc drive apparatus as in claim 1 including means for mounting a plurality of transducers comprising a block carried on the front of said carriage having a plurality of slots, one for each of said transducers to be mounted, and means for locating each of said transducers adjacent a respective disc comprising an arm mounted in each of said slots extending out from said block toward said respective disc, and a suspension element attached to said arm and carrying said transducer.

3. A disc drive apparatus as in claim 1 wherein said coil is oval in cross-section, and its supporting bobbin is located within said rectangular framework so that the ends of the coil protrude from the framework and define symmetrical openings on either side of said carriage for cooperation with magnetic pole pieces of said voice coil motor sections for cooperating with the motor sections to move the carriage in response to activation of said motor sections.

4. A disc drive as in claim 3 wherein said carriage is open on the sides toward said motor sections, said coil extending through said open sides to define said semi-cylindrical open voice coils.

5. A disc drive as in claim 3 wherein said coil and said bobbin define said pair of semi-cylindrical openings on either side of said plane, said openings cooperating with said motor sections which are shaped to conform to said openings.

6. A disc drive as in claim 1 including a cable support bracket mounted at the rear of said motor sections for supporting and guiding a connector cable to said transducers at the end of the path of travel of said carriage distant from said discs, said connector cable extending from the rear of said carriage to said cable support bracket.

7. A disc drive as in claim 6 wherein said cable support bracket comprises means for causing said connector cable to loop back on itself toward said carriage as said carriage moves away from said discs.

8. A disc drive as in claim 7 wherein said rectangular carriage framework upright posts and said bobbin define an opening facing away from said discs, said connector cable loop and said cable support bracket passing into said opening of said carriage and bobbin as said carriage moves away from said discs.

9. A disc drive as in claim 8 wherein said cable support bracket includes a planar portion lying substantially parallel to the path of movement of said carriage, said connector cable being fastened to said cable support bracket and directed into the open center of said carriage framework and the open center of said coil defined by said bobbin.

10. A disc drive as in claim 2 including a cable support bracket supporting and guiding the connector cable to said transducers fastened rearwardly of the path of travel of said carriage, said connector cable extending from the rear of said carriage to said cable support bracket.

11. A disc drive as in claim 10 wherein said cable support bracket comprises means for causing said connector cable to loop back on itself toward said carriage as said carriage moves away from said discs.

12. A disc drive as in claim 11 wherein said rectangular carriage framework upright posts and said bobbin define an opening facing away from said discs, said connector cable loop and said cable support bracket passing into said opening of said carriage and bobbin as said carriage moves away from said discs.

13. A disc drive as in claim 12 wherein a portion of said connector cable between said carriage and cable support bracket lies substantially flat along the path of movement of said carriage.

14. A disc drive as in claim 13 wherein one end of said connector cable extends through said opening in the rear of said carriage to and through an opening in the front of said carriage defined by said upright posts to connect to said head mounting block.

15. In a magnetic disc memory storage apparatus including a base, spindle means mounted to the base for rotating a plurality of discs, transducers for accessing information magnetically recorded on the discs, and an actuator assembly for moving the transducers along a straight line to distal track locations on the discs, the improvement comprising: said actuator assembly including a carriage, means for guiding the carriage along a linear path adjacent the periphery of the discs, and means comprising a pair of motor sections symmetrically mounted on either side of said carriage path for applying motive forces on the carriage, a single drive coil means mounted on the carriage for forming at least two effective winding sections in symmetrical relationship at opposite sides of said carriage and respectively in alignment with said motor sections to apply motive force to said carriage, and a connector cable for conveying signals from said transducers passing through said carriage and lying flat along the path of said carriage between the motor sections and extending out to a cable support bracket at the rear of the motor sections.

16. A disc drive as in claim 15 wherein said cable support bracket comprises means for causing said cable to loop back on itself toward said carriage as the carriage moves away from said discs.

17. A disc drive as in claim 16 wherein said cable support bracket includes a planar portion lying substantially parallel to the path of movement of said carriage, said connector cable being fastened to said cable support bracket and directed into said carriage and the open center of said coil.

18. A disc drive as in claim 17 wherein said carriage comprises an open framework defined by upright parallel posts and is open on the sides toward said motor sections, said coil extending through said open sides to define said semi-cylindrical open voice coils.

19. A disc drive apparatus as in claim 18 wherein said coil is oval in cross-section and is symmetrically located between upper and lower carriage rods positioned for guiding the carriage and between the motor sections for cooperating with the motor sections to move the carriage in response to activation of said motor sections.

20. A disc drive as in claim 19 wherein said coil and said bobbin define a pair of semi-cylindrical openings on either side of said means for guiding said carriage said openings cooperating with said motor sections which are shaped to conform to said openings.

* * * * *